United States Patent [19]

Sagawa et al.

[11] 4,147,696

[45] Apr. 3, 1979

[54] 1-(2-BENZOTHIAZOLYLTHIO)-PIPERIDINES

[75] Inventors: Seiji Sagawa, Hirakata; Kenichiro Numata; Hisanori Kondo, both of Nishinomiya, all of Japan

[73] Assignee: Sumitomo Chemical Company, Limited, Japan

[21] Appl. No.: 352,000

[22] Filed: Apr. 17, 1973

Related U.S. Application Data

[63] Continuation-in-part of Ser. No. 110,868, Jan. 29, 1971, abandoned.

[30] Foreign Application Priority Data

Jan. 30, 1970 [JP] Japan ..................... 45-8620

[51] Int. Cl.² ........................... C07D 417/12
[52] U.S. Cl. ..................... 546/198; 260/786
[58] Field of Search .................. 260/293.57, 786

[56] References Cited

U.S. PATENT DOCUMENTS

| | | | |
|---|---|---|---|
| Re. 19,286 | 8/1934 | Zaucker et al. .................. 18/53 |
| 2,768,988 | 10/1956 | Christensen et al. ............. 260/786 |
| 3,467,621 | 9/1969 | Summers ......................... 260/41.5 |
| 3,532,693 | 10/1970 | Sullivan et al. ................. 260/247.1 |

Primary Examiner—Natalie Trousof
Assistant Examiner—Richard A. Schwartz
Attorney, Agent, or Firm—Craig & Antonelli

[57] ABSTRACT

A 1-(2-benzothiazolylthio)-piperidine compound of the formula:

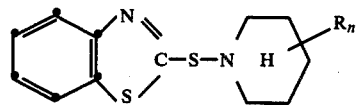

wherein R is a lower alkyl group substituted at least at the 3, 4 and/or 5 positions and n is an integer from 1 to 3, which is prepared by the reaction of 2-mercaptobenzothiazole or its reactive derivative with an alkylated piperidine or its N-halogenated derivative and useful as a vulcanization accelerator having an improved scorching property.

8 Claims, 1 Drawing Figure

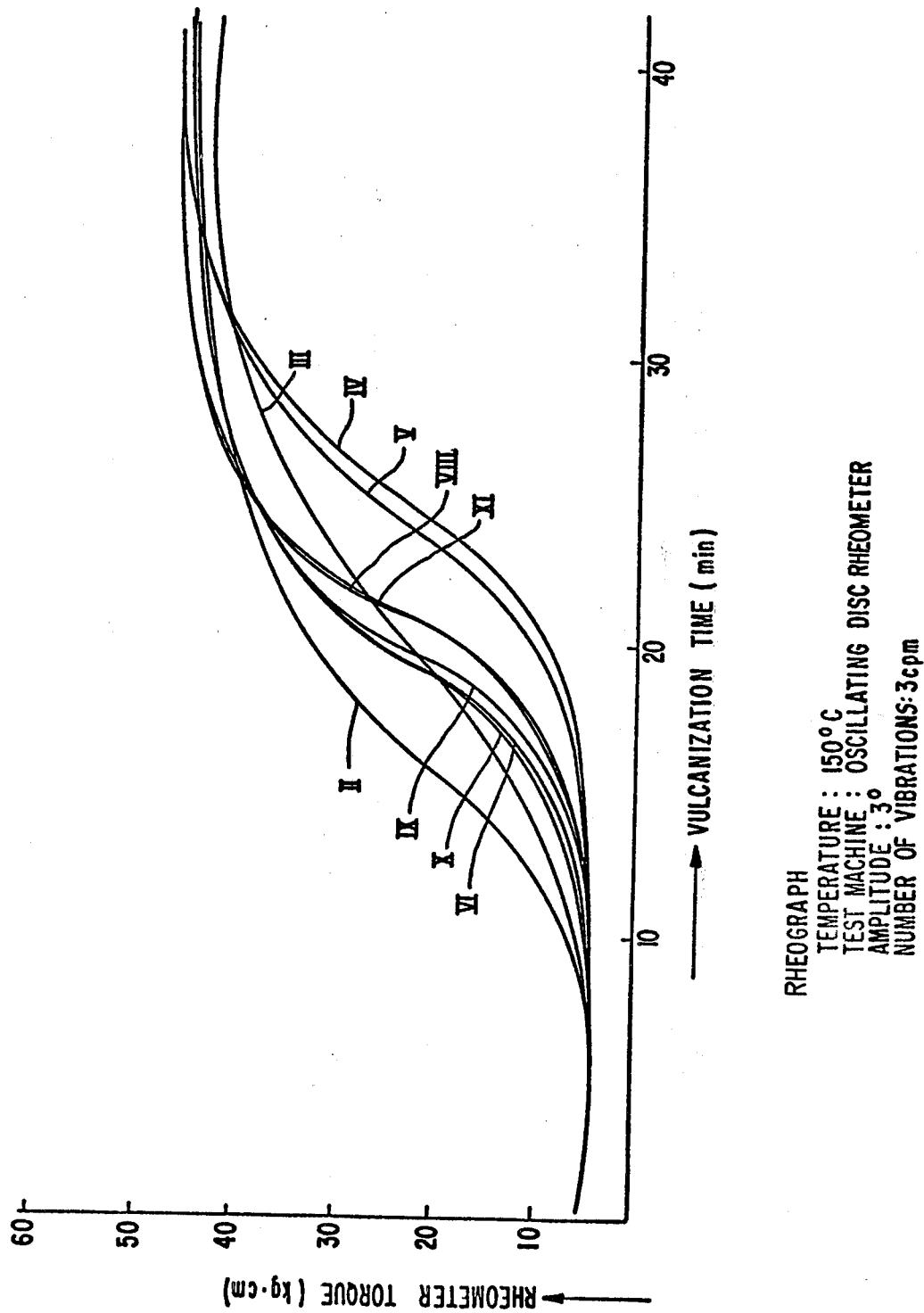

1-(2-BENZOTHIAZOLYLTHIO)-PIPERIDINES

This is a continuation-in-part application of a copending application Ser. No. 110,868, filed Jan. 29, 1971, now abandoned.

The present invention relates to a 1-(2-benzothiazolylthio)-piperidine compound and its production and use.

The said 1-(2-benzothiazolylthio)-piperidine compound is representable by the formula:

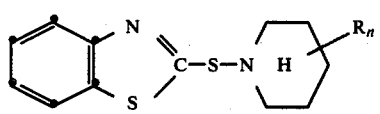

wherein R is a $C_1$-$C_4$ alkyl group substituted at least at the 3, 4 and/or 5 positions and n is an integer from 1 to 3.

On the vulcanization of natural and synthetic rubbers, there have been used various vulcanization accelerators. With the development of rubber industry and from the demand for the rationalization of processing operations, there has been desired the appearance of a vulcanization accelerator which does not initiate early vulcanization (this property being hereinafter referred to as a superior scorch retarding property) and, when a temperature for vulcanization is once reached, the vulcanization is accomplished quickly. Among numerous vulcanization accelerators, N-cyclohexylbenzothiazole-2-sulfeneamide (hereinafter referred to as "CZ") and benzothiazolylsulfenemorpholide (hereinafter referred to as "NBS") which correspond respectively to the following formulae [II] and [III] meet such desire to a certain extent:

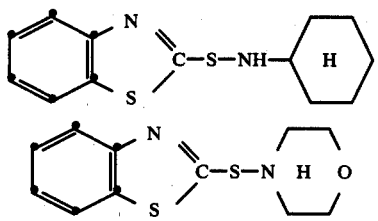

However, they are still not satisfactory. That is, CZ [II] is relatively high in the vulcanization rate but has an inferior scorch retarding property so that, in summer season, it results occasionally in hardening of rubber materials to cause difficult processing operations. NBS [III] has a superior scorch retarding property but the vulcanization rate is low so that a longer vulcanization time is required.

As the result of the study seeking a new vulcanization accelerator overcoming the disadvantages as seen in the known vulcanization accelerators, it has now been found that the 1-(2-benzothiazolylthio)-piperidine compound [I] has excellent vulcanization accelerating properties and is much improved in scorch retarding property. In view of the fact that 1-(2-benzothiazolylthio)-piperidine [I: n = 0] is extremely inferior in scorch retarding property and has no practical utilizability [G. A. Blokh: "Organic Accelerators in the Vulcanization of Rubber" (Israel Program for Scientific Translation Ltd.), pages 217 and 218 (1968)], the above finding is of unexpected nature.

FIG. 1 is a graph showing a relationship between torque (Kg . cm) of a test strip and vlucanization time (min) measured at 150° C. using a rheometer during vulcanization of an SBR test strip containing a compound of the present invention or a known compound.

According to the present invention, the 1-(2-benzothiazolylthio)-piperidine compound [I] can be prepared by reacting a 2-mercaptobenzothiazole having the formula:

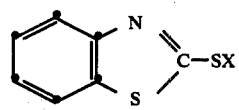

wherein X is hydrogen, a halogen, an alkali metal, —NH$_2$ or

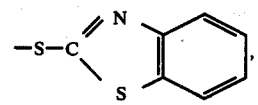

with a piperidine having the formula:

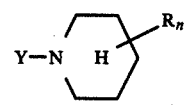

wherein R and n are each as defined above and Y is hydrogen or a halogen

The reaction may be advantageously conducted in an inert solvent such as water, a liquid aromatic hydrocarbon (e.g. benzene, toluene, xylene), a liquid halogenated aromatic hydrocarbon (e.g. monochlorobenzene, dichlorobenzene) or an aliphatic hydrocarbon (e.g. hexane, heptane, ligroin). The reaction temperature is within a range of 20° C. and 80° C. It is preferable to use the piperidine in a small excess amount to the 2-mercaptobenzothiazole.

Examples of the piperidine are 3-methylpiperidine, 4-methylpiperidine, 3,5-dimethylpiperidine, 4-ethylpiperidine, 3,5-diethylpiperidine, 4-propylpiperidine, etc.

The 1-(2-benzothiazolylthio)-piperidine compound [I], the vulcanization accelerator of the invention, may be used in a per se conventional manner. The amount of the vulcanization accelerator to be compounded into a rubber composition may be from 0.5 to 3.0% by weight, preferably from 1.0 to 2.0% by weight, on the basis of the amount of the rubber composition. The amount of sulfur to be used in combination with the vulcanization accelerator may be from 2.0 to 2.5% by weight on the same basis as above, which is within a range conventionally adopted. If necessary, there may be also compounded into the rubber composition any conventional additive such as stearic acid, carbon black, process oil, zinc oxide, an oxidation inhibitor or a kneading promotor. The vulcanization is normally effected at a temperature from 100° to 150° C.

Practical and presently preferred embodiments of the present invention are illustratively shown in the following Examples.

EXAMPLE 1

In a 500 ml volume flask, there are charged 2-mercaptobenzothiazole (UV absorption spectrum: 329 mμ) (41.28 g), sodium hydroxide (10 g) and water (180 ml), and the resultant mixture is stirred to form a solution. After the addition of 3-methylpiperidine (27.2 g) to the resulting solution, a 15% by volume aqueous solution of sodium hypochlorite (138.5 ml) is dropwise added thereto in 2 hours, during which the inner temperature is kept below 70° C. The reaction mixture is allowed to stand at the same temperature for 1 hour and then shaken with ethyl acetate (150 ml). The ethyl acetate extract is washed with water and distilled under reduced pressure to give 1-(2-benzothiazolylthio)-3-methyl-piperidine (62.3 g).

Yield, 94.4%.

Elementary analysis: Calcd., C = 58.64%; Found, C = 58.7%.

IR absorption spectrum: 567 cm$^{-1}$ (S-N).

UV absorption spectrum: 282 mμ.

EXAMPLE 2

The reaction is carried out as in Example 1 but using 3,5-dimethylpiperidine (32.8 g) in place of 3-methylpiperidine to give 1-(2-benzothiazolylthio)-3,5-dimethyl-piperidine (67.4 g).

Yield, 97.0%.

Elementary analysis: Calcd., C = 60.42%; Found, C = 60.4%.

IR absorption spectrum: 564 cm$^{-1}$ (S-N).

UV absorption spectrum: 282 mμ.

EXAMPLE 3

In a 1 liter volume flask, there are charged 2-mercaptobenzothiazole (50.1 g) and carbon tetrachloride (500 ml), and chlorine gas is introduced therein at a temperature from 70° to 75° C. The resultant mixture is kept at the same temperature while stirring until the mixture becomes reddish brown and transparent whereby benzothiazolyl-2-sulfenyl chloride is produced. After the addition of 4-isopropylpiperidine (77 g) at a temperature below 20° C., the precipitated salt is separated by filtration. The filtrate is concentrated to dryness. The residue is dissolved in tetrahydrofuran (300 ml), and the resulting solution is poured onto a column of activated alumina. The eluate from the bottom of the column is concentrated under reduced pressure to give 1-(2-benzothiazolylthio)-4-isopropylpiperidine (110.2 g).

Yield, 87.6%.

Elementary analysis: Calcd., C = 58.21%; Found, C = 58.2%.

IR absorption spectrum: 568 cm$^{-1}$ (S-N).

UV absorption spectrum: 282 mμ.

EXAMPLE 4

A test strip was prepared in a conventional manner using the following composition:

| Component | Parts by weight |
|---|---|
| Styrene butadiene rubber | 100 |
| HAF carbon | 50 |
| Process oil | 9 |
| Stearic acid | 3 |
| Zinc oxide | 5 |
| Sulfur | 2 |
| Test compound | 1 |

According to the method described in JIS-K6300 (Japanese Industrial Standard K6300), the scorching test (at 135° C.) was carried out on the above prepared test strip. The readings of the Mooney values are shown in Table 1. The test strip was also subjected to torque measurement (at 150° C.) using a rheometer (manufactured by Toyo Seiki Co., Ltd.). The rheometer curves obtained thereby are shown in FIG. 1 of the accompanying drawing.

Table 1

| Test compound No. | Mooney value | | | |
|---|---|---|---|---|
| | Lowest value | ML$_5$ | ML$_{35}$ | ML$_{\Delta 30}$ |
| II | 42 | 22.45 | 28.45 | 6.00 |
| III | 42 | 31.55 | 38.40 | 6.45 |
| IV | 42 | 43.45 | 48.05 | 4.20 |
| V | 42 | 42.30 | 47.05 | 4.35 |
| VI | 41 | 28.25 | 33.25 | 5.00 |
| VII | 41 | 28.20 | 33.15 | 4.55 |
| VIII | 41 | 27.20 | 32.20 | 5.00 |

Remarks: The test compound numbers corresponding respectively to the following chemical structures, the test compounds Nos. II and III being known:

| Test Compound No. | Chemical Structure |
|---|---|
| II | benzothiazole–C–S–NH–(cyclohexyl H) |
| III | benzothiazole–C–S–N(morpholine H O) |
| IV | benzothiazole–C–S–N(piperidine with CH$_3$, H) |
| V | benzothiazole–C–S–N(piperidine with CH$_3$, H, CH$_3$) |
| VI | benzothiazole–C–S–N(piperidine H)–CH$_3$ |
| VII | benzothiazole–C–S–N(piperidine H)–CH(CH$_3$)$_2$ |
| VIII | benzothiazole–C–S–N(piperidine H)–C$_2$H$_5$ |

What is claimed is:

1. A 1-(2-benzothiazolylthio)-piperidine compound of the formula:

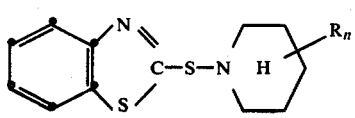

wherein R is a $C_1$-$C_4$ alkyl group substituted at least at the 3, 4 and/or 5 positions and n is an integer of from 1 to 3.

2. A compound of claim 1, wherein R is methyl.

3. A compound of the formula:

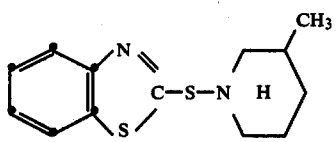

4. A compound of the formula:

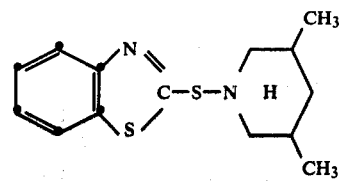

5. A compound of claim 1, wherein R and n are so selected that the piperidine moiety is selected from the group consisting of 3-methylpiperidine, 4-methylpiperidine, 3,5-dimethylpiperidine, 4-ethylpiperidine, 3,5-diethylpiperidine, and 4-propylpiperidine.

6. A compound of claim 1, wherein R and n are so selected that the piperidine moiety is 4-methyl piperidine.

7. A compound of claim 1, wherein R and n are so selected that the piperidine moiety is 4-isopropylpiperidine.

8. A compound of claim 1, wherein R and n are so selected that the piperidine moiety is 4-ethylpiperidine.

* * * * *